United States Patent
Wawers et al.

(10) Patent No.: US 7,842,901 B2
(45) Date of Patent: Nov. 30, 2010

(54) DEVICE FOR DRILLING AND FOR REMOVING MATERIAL USING A LASER BEAM

(75) Inventors: Welf Wawers, Aachen (DE); Arnold Gillner, Roetgen (DE)

(73) Assignee: Fraunhofer-Gesellschaft zur Foerderung der Angwandten Foerschng E.V., Munich (DE)

( * ) Notice: Subject to any disclaimer, the term of this patent is extended or adjusted under 35 U.S.C. 154(b) by 344 days.

(21) Appl. No.: 11/920,371

(22) PCT Filed: Mar. 3, 2006

(86) PCT No.: PCT/EP2006/001964
§ 371 (c)(1),
(2), (4) Date: Nov. 14, 2007

(87) PCT Pub. No.: WO2007/000194
PCT Pub. Date: Jan. 4, 2007

(65) Prior Publication Data
US 2009/0045176 A1 Feb. 19, 2009

(30) Foreign Application Priority Data
Jun. 28, 2005 (DE) .................. 10 2005 030 149
Sep. 30, 2005 (DE) .................. 10 2005 047 328

(51) Int. Cl.
*B23K 26/14* (2006.01)
*B23K 26/02* (2006.01)

(52) U.S. Cl. .................. 219/121.67; 219/121.79

(58) Field of Classification Search .. 219/121.6–121.86
See application file for complete search history.

(56) References Cited

U.S. PATENT DOCUMENTS

| 3,720,454 | A | * | 3/1973 | Inderhees | 359/201.1 |
| 4,822,974 | A | * | 4/1989 | Leighton | 219/121.67 |
| 5,365,288 | A | * | 11/1994 | Dewald et al. | 353/98 |
| 5,632,083 | A | * | 5/1997 | Tada et al. | 29/827 |
| 6,355,907 | B1 | * | 3/2002 | Kuehnle et al. | 219/121.7 |
| 6,362,454 | B1 | | 3/2002 | Liu | |
| 6,433,303 | B1 | * | 8/2002 | Liu et al. | 219/121.7 |
| 6,444,948 | B1 | * | 9/2002 | Giering et al. | 219/121.73 |

FOREIGN PATENT DOCUMENTS

| CA | 2260462 | 1/1999 |
| DE | 197 41 029 | 9/1997 |
| DE | 197 45 280 | 10/1997 |
| DE | 103 40 931 | 9/2003 |

* cited by examiner

*Primary Examiner*—Sang Y Paik
(74) *Attorney, Agent, or Firm*—Karl F. Milde, Jr.; Eckert Seamans Cherin & Mellott, LLC (57) ABSTRACT

A device for drilling and for removing material using a laser beam comprises: a rotating image rotator (2); a beam manipulator (1) which, when viewed in the beam direction, is arranged in front of the image rotator and which serves to adjust the angle and position of the beam relative to the rotation axis of the image rotator; and a focusing device (3) located on the output side of the image rotator. A compensating device (3, 13, 14, 15) is placed between the image rotator and the focusing device and rotates with the image rotator in the same direction of rotation and with the same rotational frequency. The compensating device has a parallel displacement unit (15) and an angle changing unit (13, 14), and the compensating device, in a basic setting, is adjustable in its rotating position relative to the image rotator.

20 Claims, 8 Drawing Sheets

DEVICE FOR DRILLING AND FOR REMOVING MATERIAL USING A LASER BEAM

BACKGROUND OF THE INVENTION

The present invention relates to a device for drilling and for removing material using a laser beam, the device comprising a rotating image rotator, a beam manipulator which, when viewed in the beam direction, is arranged in front of the image rotator and which serves to adjust the angle and position of the beam relative to the rotation axis of the image rotator, and a focusing device located on the output side of the image rotator.

In the car industry, in filtering technology, electronics and many other sectors, small bores or drilled holes are needed for very different applications. Examples are injection nozzles for fuels, in the case of which a large number of drilled holes or bores that are arranged in a definite way ensure a uniform distribution of fuel during the injection process, resulting in reduced fuel consumption. To achieve in this field, and also with other applications, a reproducible distribution that is as homogeneous as possible, the drilled holes must be very small and manufactured with high precision. The typical bore diameters are e.g. in the case of diesel injection nozzles around 100 µm at a material thickness of 1 mm and required accuracies of 1 µm. Other examples with similar demands and partly even smaller bore diameters of 20-50 µm are spinnerets for textile fibers, outlet nozzles for air bearings or starting-hole drillings for wire-cut EDM. In all of these cases classic drilling methods are only used to a limited degree due to the demands made on the material, the aspect ratios and the required bore geometry and machining speed.

Laser technology with its specific radiation characteristics offers an alternative that in the past years led to a great number of applications in the above-mentioned sectors. Different drilling principles are here employed.

In the case of single-shot drilling, a single laser pulse with pulse durations of typically a few 100 µs heats and melts the material and expels it out of the drilled hole by partial evaporation.

In percussion drilling the drilled hole is formed though a number of consecutive pulses. In trepanning a small hole is first produced and the larger bore is then cut out.

In all of these cases the drilling process itself is characterized by a strong melt formation, which results in minor bore quality. The highest qualities are achieved in the so-called helical drilling technique, a planar removal process in which the material is predominantly evaporated with short laser pulses. The individual laser pulses of a highly repetitive laser are set side by side in overlapping fashion and guided along the bore circumference along a circular path. With each complete revolution, depending on laser energy and material, a thin layer of 0.1-10 µm is removed. With a great number of such circular movements the bore proper will then be generated. The bore diameter follows from the circular diameter of the beam rotation and the beam diameter. The degree of overlap of the consecutive pulses is here chosen such that the number of non-irradiated remaining edge portions is as small as possible on the one hand and the laser radiation between two pulses is traveling on to such a sufficient extent on the other hand that it does not fully impinge into the melt bath of the preceding pulse. Typically, the degree of overlap is chosen in a range between 50%-95%.

Since the melt solidifies again after one laser beam travel, the material is removed almost exclusively in vapor form, resulting in high surface qualities of the bore wall and a high reproducibility of the bore. This effect is enhanced by the use of short and ultra-short pulse lasers.

Especially the use of lasers in the femtosecond and picosecond regime permits particularly high bore qualities because the pulse powers are here in the range of 100 MW and the resultant melt film thickness is below 1 µm.

An essential precondition for the use of this drilling process is the rotation of the laser beam on a contour. In the simplest case this is a circular path. Since the circular velocity of the laser beam is extremely high, particularly great demands are made on the optical system for rotating the beam. For instance, the circular velocity is 200 mm/s in the case of a laser beam diameter of 20 µm, an overlap degree of 50% and a pulse frequency of 20 kHz. At a required bore diameter of 60 µm this means rotation frequencies of the laser beam of about 1000 Hz.

These high frequencies can no longer be realized with classic beam deflection systems, for instance galvanometer scanners. For this purpose a number of different systems rotating at fast speeds were developed in the past and already described in the literature.

One possibility of rotating a laser beam on a circular path is offered by an arrangement consisting of rotating wedge plates guiding the laser radiation onto a circular path. In this system the laser radiation is rotating at the same speed as the wedge plates. The setting of bore diameter and widening angle of the bore is here carried out by displacing and rotating the rotating wedge plates relative to one another.

Another possibility is the use of a rotating image rotator through which the laser radiation is passed. After passage through the image rotator the laser radiation is rotating both about the rotation axis of the image rotator and about itself. If a stationary focusing lens is arranged downstream of the image rotator, circular round bores can then be formed by the two rotational movements of the laser radiation that is then focused. Due to the rotation of the laser radiation in itself it is possible to implement even the tiniest bore diameters in that the helical diameter, i.e. the diameter of the laser radiation rotating about the rotation axis of the image rotator, approaches zero. This is however not possible in systems in which the laser radiation is not rotating in itself; this always requires a minimal helical diameter.

SUMMARY OF THE INVENTION

It is the object of the present invention to compensate for the impacts of geometric defects caused by the manufacturing process in image rotators as part of the device according to the invention for drilling and for removing material using a laser beam. Image rotators may be radiation-transmitting prisms such as Dove prism or Abbe-Koenig prism, but also reflecting systems such as a K-mirror arrangement.

In a device of the above-mentioned type this object is achieved in that a compensating device is placed between image rotator and focusing device and rotates with the image rotator in the same direction of rotation and with the same rotational frequency, the compensating device comprising a parallel displacement unit and an angle changing unit, and that the compensating device, in a basic setting, is adjustable in its rotating position relative to the image rotator.

With the arrangement according to the invention a uniform rotation movement (beam shape) and thus a uniform removal can be accomplished in the machining plane, whereby a round bore can be formed.

An essential component of the arrangement according to the invention is the compensating device which, in a basic setting, is adjustable in its relative rotational position with respect to the image rotator. With such a compensating device, which preferably comprises a planar displacement unit with a tiltably supported planar plate and two tiltably supported wedge plates, the laser beam exiting from the image rotator can be readjusted from the descriptive circular path back to the center. The compensating device is here rotatably arranged around the axis of the image rotator, which is preferably located in a hollow shaft, and is rotating at the same angular velocity as the Dove prism. With this arrangement it is possible to completely compensate for all manufacturing and adjusting errors of rotating optical systems based on image rotators. A particular advantage of this arrangement is here that the corrective adjustment must only be carried out once and is then applicable to all incident beam positions and angles of the image rotator. The compensating device is firmly connected to the hollow shaft after the adjusting operation.

The diameter of the beam rotation can be set by angle adjustment of the incident laser beam via the beam manipulator and thus relative to the image rotator. A lateral displacement of the beam effects a change in the incident angle of the laser radiation on the workpiece in the focus of the focusing device, preferably focusing lens, used in the drilling optic. Depending on the setting of displacement and beam tiling by the beam manipulator, positive and negative conicities of bores with different diameters can thereby be produced.

Furthermore, thanks to the special arrangement of image rotator and co-rotating compensating device, i.e. the correcting and adjusting wedge plates in the preferred embodiment, more complex and thus more flexible units can be used in stationary adjusting elements of the beam manipulator for incidence angle and rotation diameter for the last-mentioned components.

It should be emphasized that both Dove prisms and K-mirrors, which would be used without any further measures as image rotators, have the decisive drawback that with the slightest errors in the angle accuracy of the refractive and reflective surfaces deflection errors arise that upon rotations of the prism result in irregular beam movements. For instance, due to the principle the laser beam is rotating in a Dove prism at twice the angular velocity of the prism when the prism is rotating once. When the laser beam falls on the Dove prism at a specific angle, the laser beam further describes two concentric circles of the same diameter during one rotation of the prism. With deviations of the prism geometry of only a few mrad or μ(N)m the diameters of the two circles are clearly different, the centers of the circles are no longer concentric and the circular path is flattened at one side. If the incident light beam is exactly positioned on the rotation axis of the prism, the laser beam will be rotating after the prism due to the geometric error along a circular path with the same angular velocity as the prism instead of only in itself.

These inadequacies, which have already been described in the literature and have so far been considered to be not compensable, are eliminated with the arrangement of the invention which comprises a compensating device on the output side of the image rotator.

In a preferred embodiment the parallel displacement unit, which is part of the compensating device, is a plane-parallel plate which is preferably tiltably or rotatably held in a direction perpendicular to the axis of the laser beam. The adjustment of the plane-parallel plate at small angles relative to the axis of the laser beam will compensate for the displacement of the laser radiation, which is due to manufacturing defects in the image rotator, from the position of the laser beam passed through an ideally manufactured image rotator.

The second component, which is part of the compensating device, is an angle changing unit which preferably comprises two wedge plates, each as such being rotatably arranged in a direction perpendicular to the rotation axis of the image rotator and the compensating device, and thus also in a direction perpendicular to the axis of the laser beam. With these two wedge plates, which in addition have preferably opposite wedge angles, the angular change of the laser radiation, which is caused by manufacturing defects in the image rotator, from the position of the laser beam passed through an ideally manufactured image rotator will be compensated.

The two wedge plates and the plane-parallel plate should be kept adjustable relative to each other in their basic setting. To this end suitable actuators may be provided. Moreover, these parts may be mounted in a hollow shaft which in its basic setting is rotating in a fixed arrangement with respect to the image rotator.

As has already been mentioned at the outset, the image rotator can be formed in its simplest configuration shape by a prism. Moreover, a Dove prism can be used for the image rotator.

The prism in the image rotator should be arranged such that, when the image rotator is rotating once, a laser beam guided through the prism is rotated several times, in the simplest case two times.

With the arrangement of the invention, the system-immanent restrictions of, for instance, a Dove prism as an element of a rapidly rotating laser-beam drilling optic can be eliminated.

The image rotator is arranged in a hollow shaft motor for a simple construction.

While a Dove prism should be preferred as an image rotator whenever an inexpensive design is desired and a laser radiation source is used at a wavelength highly transmitting from the prism, a rigid K-mirror arrangement should be used as an image rotator whenever radiation sources of different wavelengths are used in the overall assembly.

Such a K-mirror arrangement can also be configured to be adjustable for those cases where the adjustment of the image rotator relative to the hollow shaft motor poses problems, e.g. due to temperature variations.

Instead of a Dove prism, it is also possible to use an Abbe-Koenig prism as an image rotator.

The two wedge plates, which are preferably used as an angle changing unit in the compensating device, can be arranged adjacent to each other when viewed in beam direction. With a simple arrangement the two wedge plates can thereby be rotated in fixed relationship.

To be able to set the incident beam position and the incident beam angle of the laser beam, corresponding components are provided in the beam manipulator. These adjusting units may be highly dynamic actuators.

Such a beam manipulator has the advantage, for instance in comparison with rotating wedge plate assemblies, that the optical elements needed for setting rotation diameter and incident beam angle cannot co-rotate. This simplifies the mechanical structure and considerably reduces the structural size. Moreover, much higher rotational speeds of up to 1000 Hz can be accomplished with this arrangement in combination with an image rotator. This means on account of the system that the prism must only rotate at 500 Hz because the laser beam is rotating twice during one rotation of the prism.

To be able to realize necessarily high deflection frequencies of up to 1000 Hz, highly dynamic deflection systems such as torsion and tilt mirrors should be used on the basis of lithium niobate.

For instance in embodiments of the invention highly dynamic scanners can be used for setting the beam deflection and thus the rotation diameter in the beam manipulator. With a synchronization of rotation angle and beam deflection any desired drilled-hole shapes, such as rectangles and freeforms, can be realized that are e.g. needed for spinnerets in synthetic fiber production.

A focusing device provided in beam direction after the compensating device should preferably additionally be arranged to be displaceable in beam direction so as to be able to set the focus on the workpiece or the focus depth before and during machining.

For setting the incident beam position of the laser beam in the image rotator and thus the entrance bore diameter and for setting the incident beam angle and thus the exit bore diameter, a rotatable wedge plate which is rotatably arranged in a direction perpendicular to the optical path, and a mirror which is jointly displaceable with the wedge plate in the beam propagation direction may be used. With this arrangement it is possible to set the two adjustment parameters jointly. If for instance the entrance diameter is changed by adjusting the wedge plate, but the exit diameter is to remain the same, the incident beam angle is adapted accordingly by displacing the mirror and the wedge plate.

The polarization of the laser radiation is an important parameter for producing and mastering high bore qualities. Different polarization directions of the laser radiation during one revolution of the laser radiation produce different removal results. That is why it is of advantage when the polarization is made to co-rotate in a defined way with respect to the incidence plane or when circularly polarized laser light is used. To this end, however, special optical elements are needed that must also co-rotate. To co-rotate the polarization, a $\lambda/2$ plate co-rotating in synchronism with the image rotator is arranged between beam manipulator and image rotator.

As an alternative, in the case of linearly polarized radiation, said radiation may be converted by using a stationary $\lambda/4$-plate into circularly polarized radiation, whereby the removal variations caused by polarization are reduced.

In a particular embodiment of the invention, a Dove prism is used with a special trapezoid angle at which the polarization-caused performance variations of the emitted laser beam are minimized and thus impacts on the drilled hole shape cannot be detected along a beam rotation. The prism of the image rotator should have a trapezoid angle at which the polarization-caused removal variations during one rotation of the prism are minimized. The trapezoid angle should here be kept as large as possible, but this will significantly increase the constructional length of the rotary optic, so that because of the device the two possibilities of a large trapezoid angle and of a maximal constructional length should be weighed up against one another.

If drilled holes that are not rotation-symmetrical are to be produced, the elements of the beam manipulator can be arranged to be movable in synchronism with the rotational movement of the image rotator.

The device according to the invention is particularly useful in fields that have been outlined at the outset with reference to the prior art.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-8 of the drawings. Identical elements in the various figures are designated with the same reference numerals.

Various devices, as shown in the figures, are provided for drilling and for removing material using a laser beam.

The device can be subdivided into a beam manipulator 1, an image rotator 2, a compensating device 3 and a focusing device 4, viewed in the direction of the extension of a laser beam, which is designated by reference numeral 5.

Figure 1:
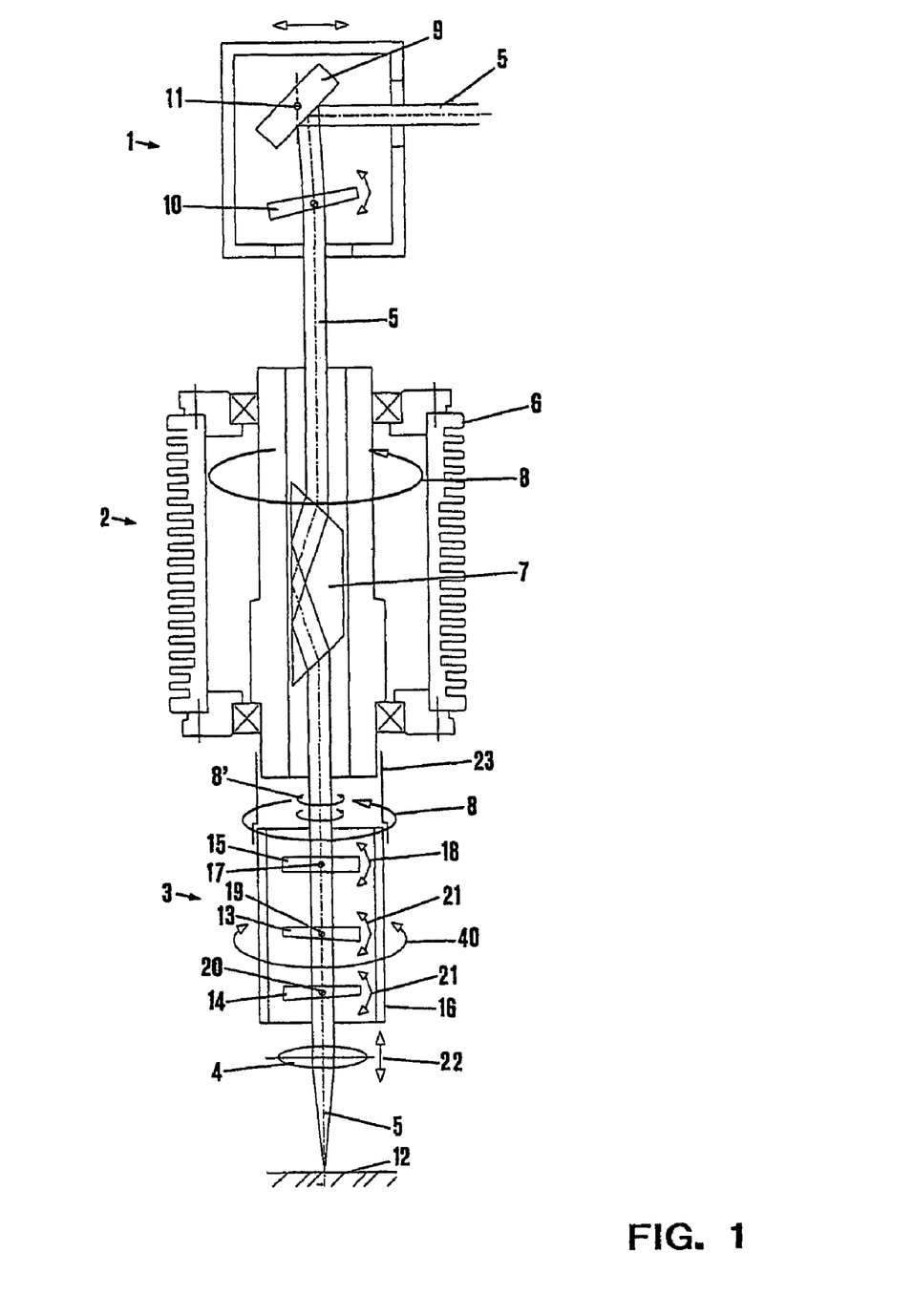
FIG. 1 shows a device according to the invention with an image rotator in the form of a Dove prism.

The image rotator 2, which is arranged in a rapidly rotating hollow-shaft motor 6 in the center thereof forms a drilling optic, wherein in the illustrated embodiment a Dove prism 7 is used as the image rotator 2. The Dove prism 7 is positioned in the hollow shaft motor 6 such that, when the image rotator 2 or the hollow shaft motor 6, respectively, is rotated once, as illustrated by the rotary arrow 8, the laser beam 5 passed through the prism 7 is thereby rotated twice, which is illustrated by the two rotary arrows 8' on the output side of the hollow shaft motor 6.

The beam manipulator 1, which when viewed in the beam direction of the laser 5 is arranged before the hollow shaft motor 6 is composed of two adjusting devices, designated by reference numerals 9 and 10. The adjusting device 9 is a device that serves to adjust the incident beam position of the laser beam 5, to which end the mirror 9 shown in FIG. 1 is held to be rotatable or tiltable about an axis 11 (axis 11 extends in a direction perpendicular to the beam direction of the laser beam 5). The adjusting device 10 serves to adjust the incident beam angle of the laser beam 5 passed onto the prism 7 of the image rotator 2. The two adjusting devices 9, 10 can be provided with highly dynamic actuators, such as for instance piezo adjusters and solid-state tilt adjusters, which are not shown in more detail in the figures, to be able to realize nonrotation-symmetrical drilled holes in the machining plane, designated with reference numeral 12.

Viewed in the beam direction of the laser beam 5, two adjustable wedge plates 13 and 14 as well as a plane-parallel plate 15 are positioned behind the hollow shaft motor 6. This plane-parallel plate and these two adjustable wedge plates 13, 14 are held in a sleeve 16 that is concentrically rotatable about the rotation axis. The plane-parallel plate 15 which, viewed in beam direction, is arranged directly after the hollow-shaft motor 6 and the image rotator 2, respectively, forms a parallel displacement unit for the laser beam 5, whereas the two wedge plates 13, 14 following the plane-parallel plate 15 when viewed in beam direction form an angle changing unit for the laser beam 5. With this compensating device 3 the laser beam 5 led out of the center due to geometric or positional flaws of the Dove prism can be adjusted back to the center, i.e. to the rotation axis of the image rotator 2.

For such a setting the plane-parallel plate 15 can be tilted about an axis 17 in a direction perpendicular to the beam axis or the axis of the hollow shaft motor 6, as illustrated by the double-headed arrow 18. This is also true for the two wedge plates 13 and 14 that are tiltable about respective axes 19 and 20, extending in a direction perpendicular to the beam axis, as illustrated by the two double-headed arrows marked with reference numeral 21. To correct the angular errors (parallel displacement) with the two wedge plates 13, 14, these two wedge plates have opposite wedge angles, as can be seen in FIG. 1. However, these wedge angles need not be of the same size.

The two wedge plates 13 and 14 as well as the plane-parallel plate 15 can also be arranged in a different arrangement relative to each other and at different distances from each other inside the compensating device 3, each time in dependence upon the geometry of the plane and wedge plates. It is however important that these optical parts of the compensating device are arranged in the sleeve 16 to adjust them inside said sleeve 16, and thus to set the laser beam, so that after the adjustment has been made said parts are rotating in fixed relationship together with the image rotator 2, for which purpose the sleeve 16 of the compensating device 3 is connected via the illustrated coupling member 23. Thanks to this coupling via the sleeve 16 the hollow-shaft motor 6 and the image rotator 2, respectively, and the compensating device 3 and the sleeve 16, respectively, are rotating at the same rotational speed.

The focusing device 4 which when viewed in beam direction is arranged behind the compensating device 3 may be composed of one or several focusing lenses although FIG. 1 only shows one single lens with which the laser beam 5 is focused onto the workpiece and the machining plane 12, respectively. This focusing device 4 can additionally be displaced in beam direction, as outlined by the double-headed arrow 22, so as to permit a continuous adjustment of the laser beam focus in the case of deep bores and in order to change the geometry of the bore.

Figure 2:
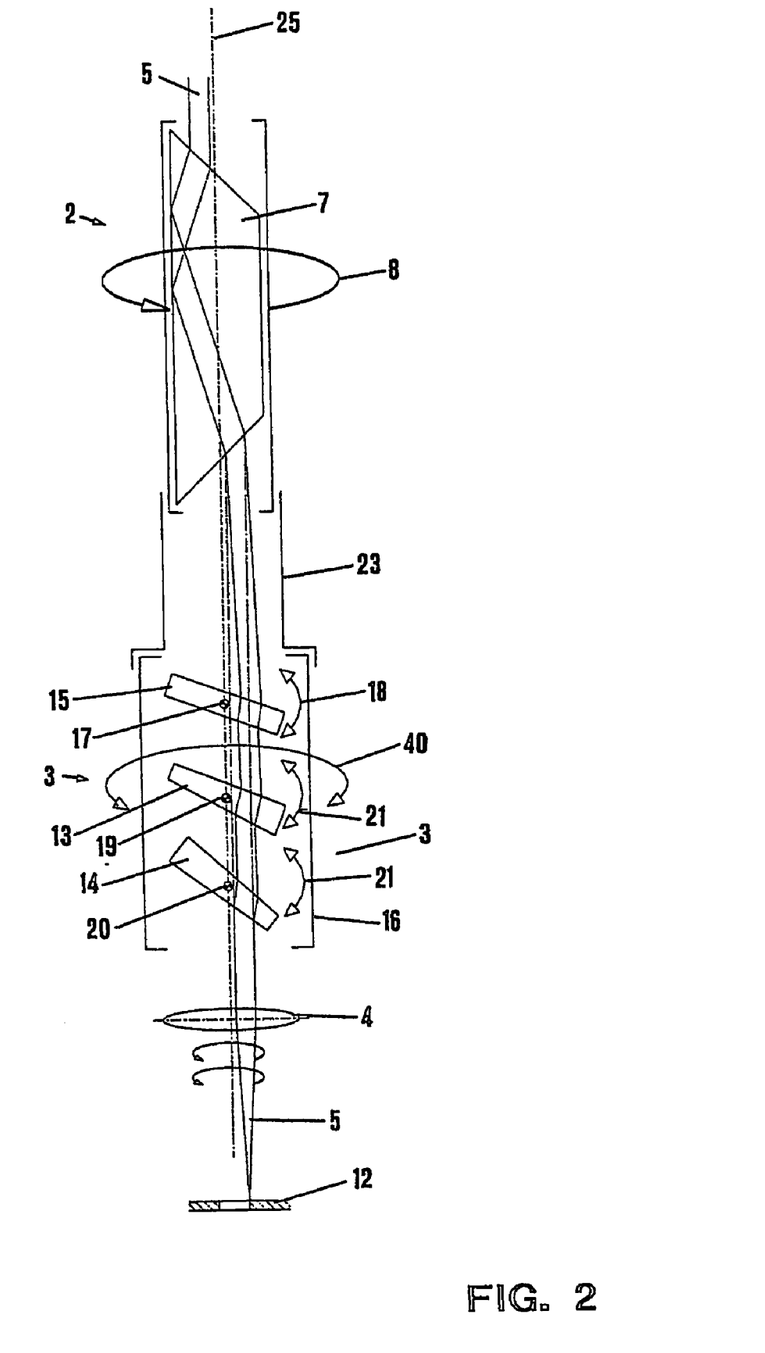
FIG. 2 shows a detail of the image rotator, the compensating device, and the focusing device of FIG. 1.

FIG. 2 shows the extension of the laser beam 5 through the prism 7, the plane-parallel plate 15 and the two wedge plates 13 and 14.

The beam 5 entering into the prism 7 is displaced by corresponding reflection in the prism 7 and diffraction on the exit surface of the prism 7. Due to tolerances caused by the manufacturing process the laser beam 5 exiting out of the prism 7 differs in position and angle from a laser beam 39 which would be obtained after passage through an ideal prism, as can be seen with reference to FIG. 2. FIG. 2 shows the compensating device 3 coaxially changed or rotated relative to the prism 7 such that the axes of the plane-parallel plate 15 and the wedge plates 13, 14 are normal to the surface formed by the laser beams 5 and 39. This converts the spatial positional and angular deviation into a planar deviation (the rotational movement of the compensating device 3 relative to the prism 7 is outlined by the double-headed arrow 40).

To change the angle, wedge plates 13 and 14 are provided that on account of their wedge angle and the orientation of the wedge angle relative to the entering laser beam and their tilt about their respective axes 19, 20 change the angle of the laser beam 5 to the angle of the ideal laser beam 39. The laser beam 5 is also shifted in its position by the wedge plates 13 and 14. The plane-parallel plate 15 changes the position of the laser beam 5 without producing an angular change in the beam 5. This has the effect that the laser beam 5 of the real prism 7 can be adjusted to the position of the ideal laser beam 39.

As can be seen with reference to FIG. 2, it is possible with the compensating device 3 to compensate for a spatial position caused by manufacturing flaws in the image rotator 2 and for an angular displacement of a laser beam 5.

It should be noted that insofar as the individual figures show components that are identical with or comparable to components of other figures, like reference numerals are used, so that the observations made on one embodiment can be applied to other embodiments by analogy.

Likewise, the individual FIGS. 2 to 8 show the respective ideal optical path of the laser radiation by way of dash-dotted lines whereas the real optical path (with geometric and positional flaws of the prisms) is shown by way of continuous lines.

Figure 3:
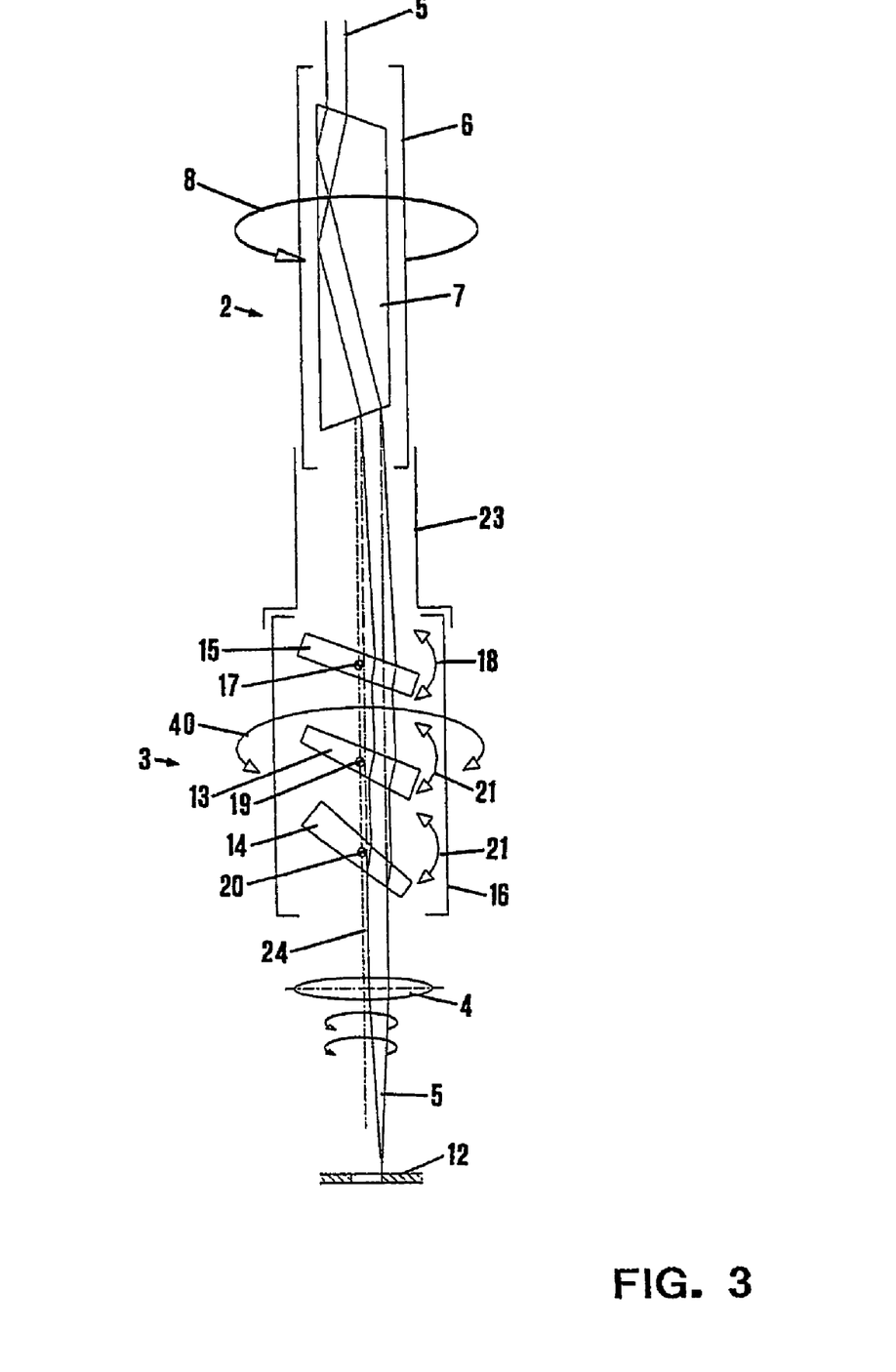
FIG. 3 is a view corresponding to that of FIG. 2, but with a Dove prism having an enlarged trapezoid angle.

FIG. 3 shows a Dove prism 7 which has an enlarged trapezoid angle in comparison with the Dove prism of FIG. 2. Such a Dove prism 7 with enlarged trapezoid angle serves to minimize polarization-induced removal variations in one revolution of the laser radiation.

Figure 4:
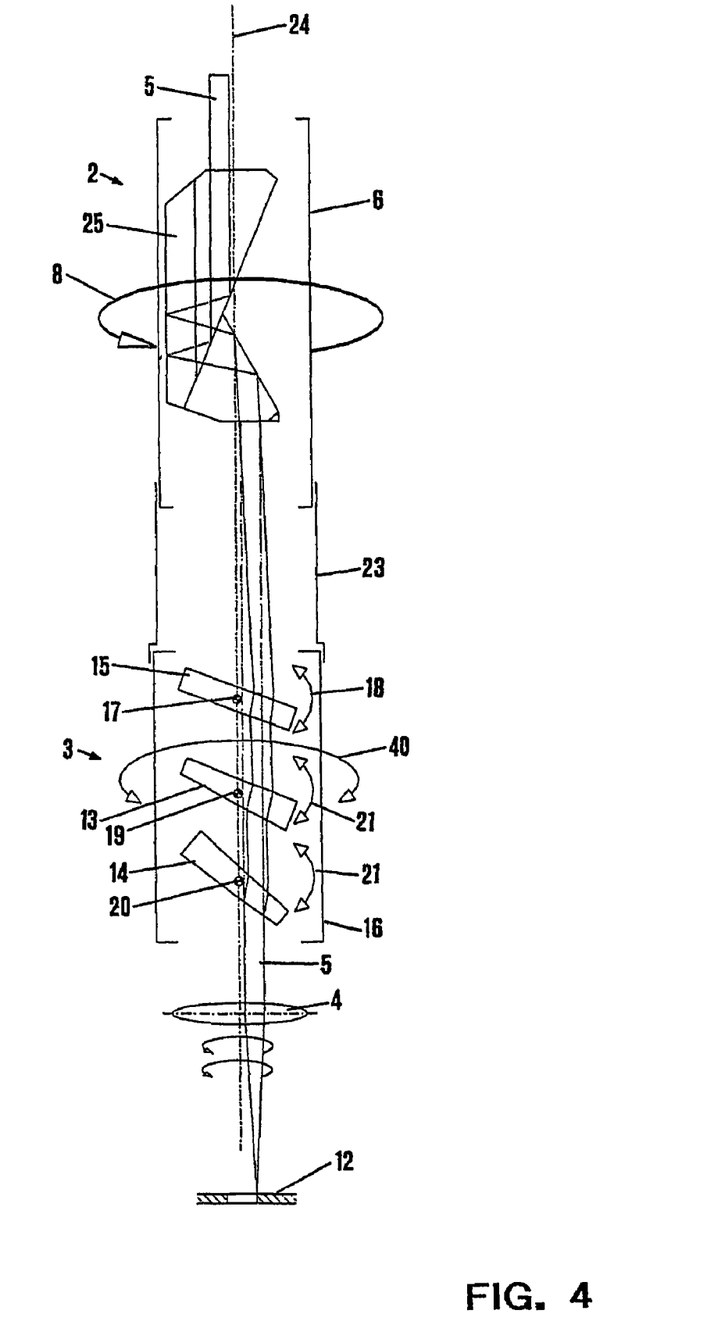
FIG. 4 is a view corresponding to FIGS. 2 and 3, in which an Abbe-Koenig prism is used as the image rotator.

In the embodiment of FIG. 4 it is only an Abbe-Koenig prism 25 that is used as the image rotator. The Abbe-Koenig prism 25 is an alternative to a Dove prism 7, as shown in FIGS. 2 and 3.

Figure 5:
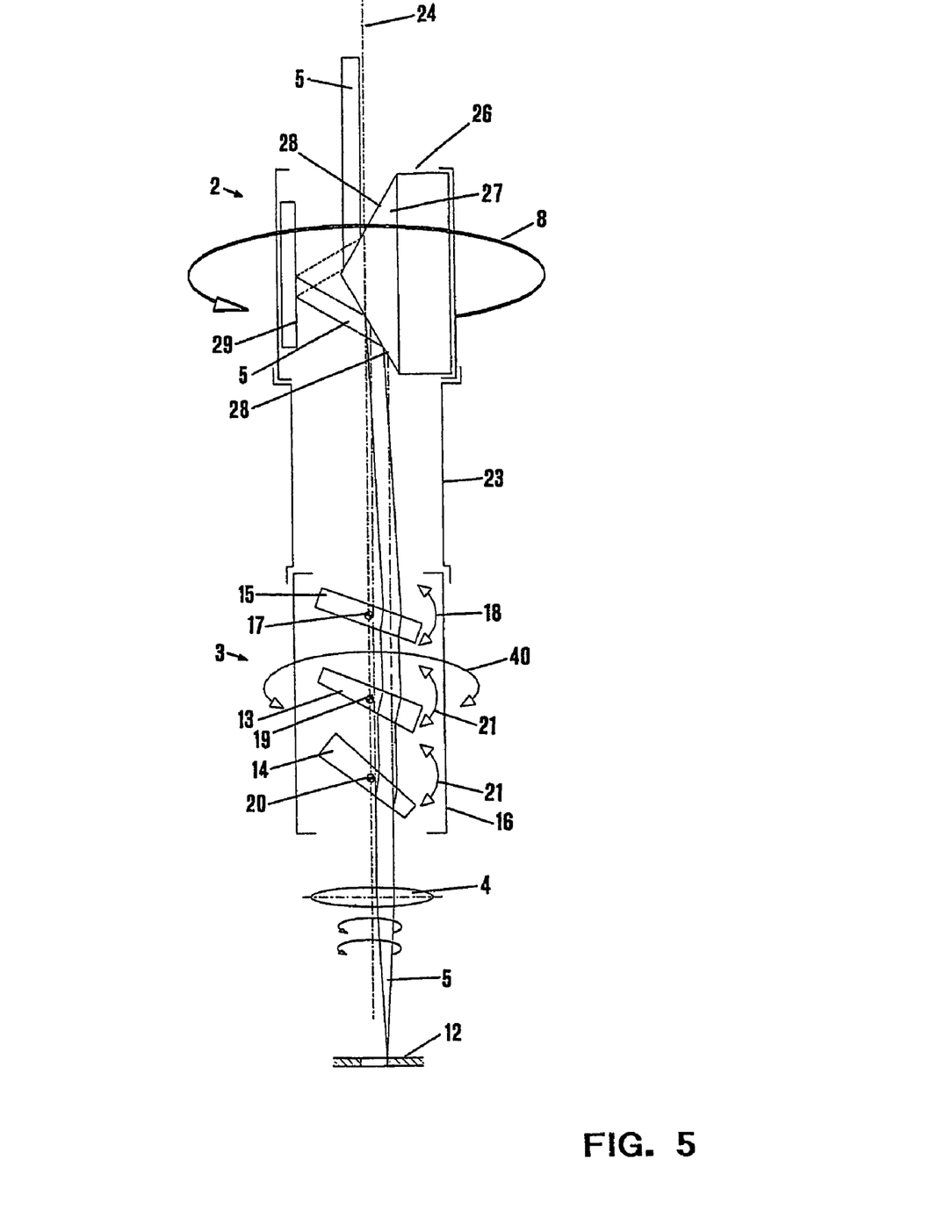
FIG. 5 is a view corresponding to FIGS. 2 to 4, in which a K-mirror arrangement of rigid configuration is used.

Instead of a Dove prism 7 or an Abbe-Koenig prism 25, a K-mirror arrangement 26 can also be used in the image rotator 2. Such a K-mirror arrangement 26, which is also known as an image rotator, comprises a roof-shaped mirror arrangement 27 composed of two mirror surfaces 28, and a further mirror surface 29 opposite said mirror surfaces 28, which are positioned such that the laser beam 5 impinging on the first mirror surface 28 is directed towards the further mirror surface 29 and from there impinges on the other mirror surface 28 to be passed on from there in the direction of the axis 24 of the arrangement. In this K-mirror arrangement 26, including fixed, i.e. rigid, mirror surfaces 28 and 29, the problem arises again that the laser beam 5 exiting from the K-mirror arrangement 26 does not extend in parallel with the axis 24, so that a corresponding correction must again be made by means of the compensating device 3, as has been described above.

Figure 6:
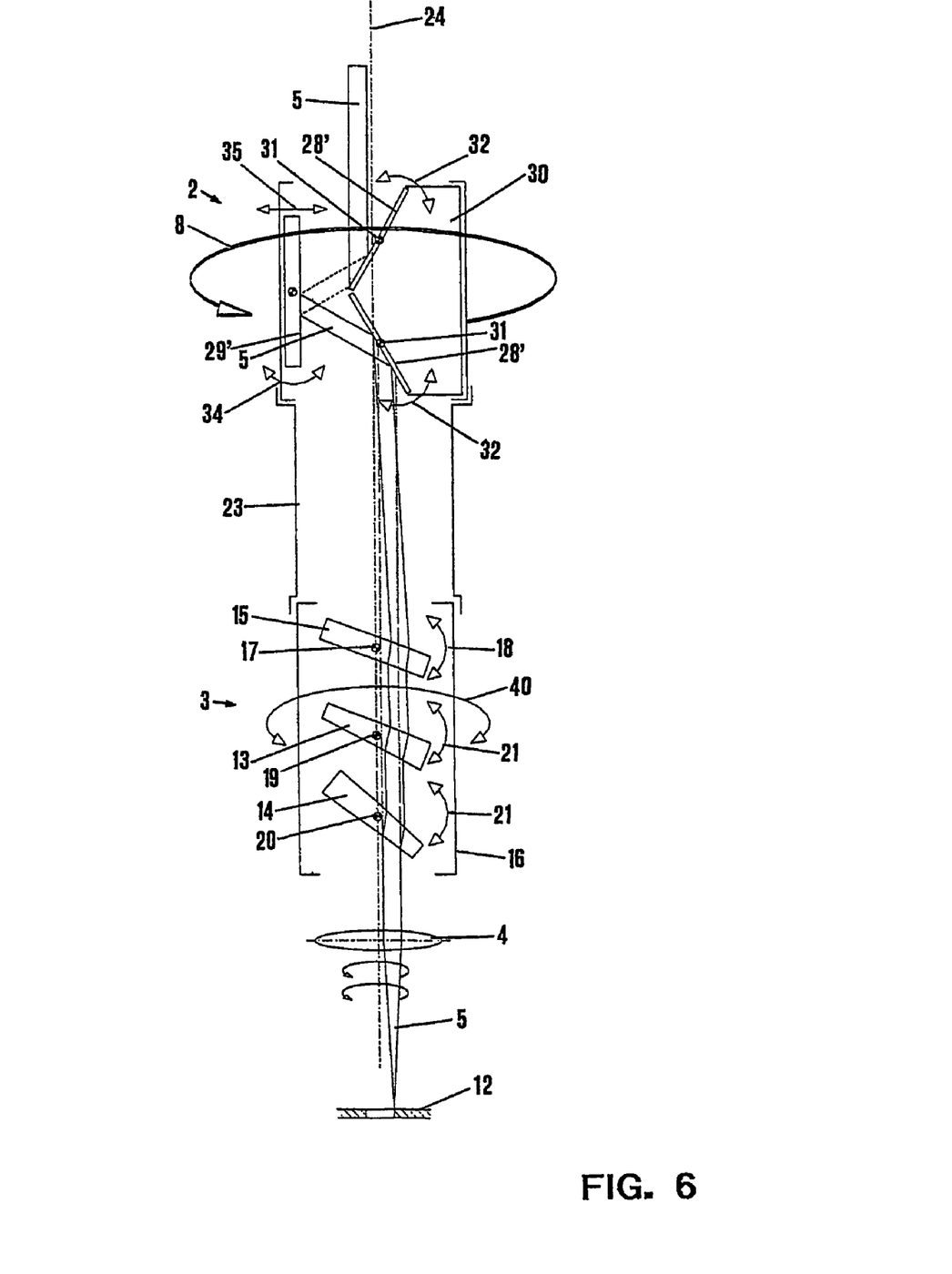
FIG. 6 shows an arrangement according to FIG. 5, but with an adjustable K-mirror arrangement.

While FIG. 5 shows a rigid K-mirror arrangement 26, FIG. 6 shows a variant which employs a K-mirror arrangement 30 which is made adjustable in that the two mirror surfaces 28' are decoupled from each other and are adjustable about respective axes 31, as outlined by the pivotal arrow 32, and moreover the further mirror 29' is pivotable about an axis 33 in the direction of arrow 34 and also displaceable in the direction of the double-headed arrow 35 in its distance perpendicular to the axis 24. With these adjusting possibilities, positional errors of the image rotator relative to the hollow shaft motor can be compensated.

Figure 7:
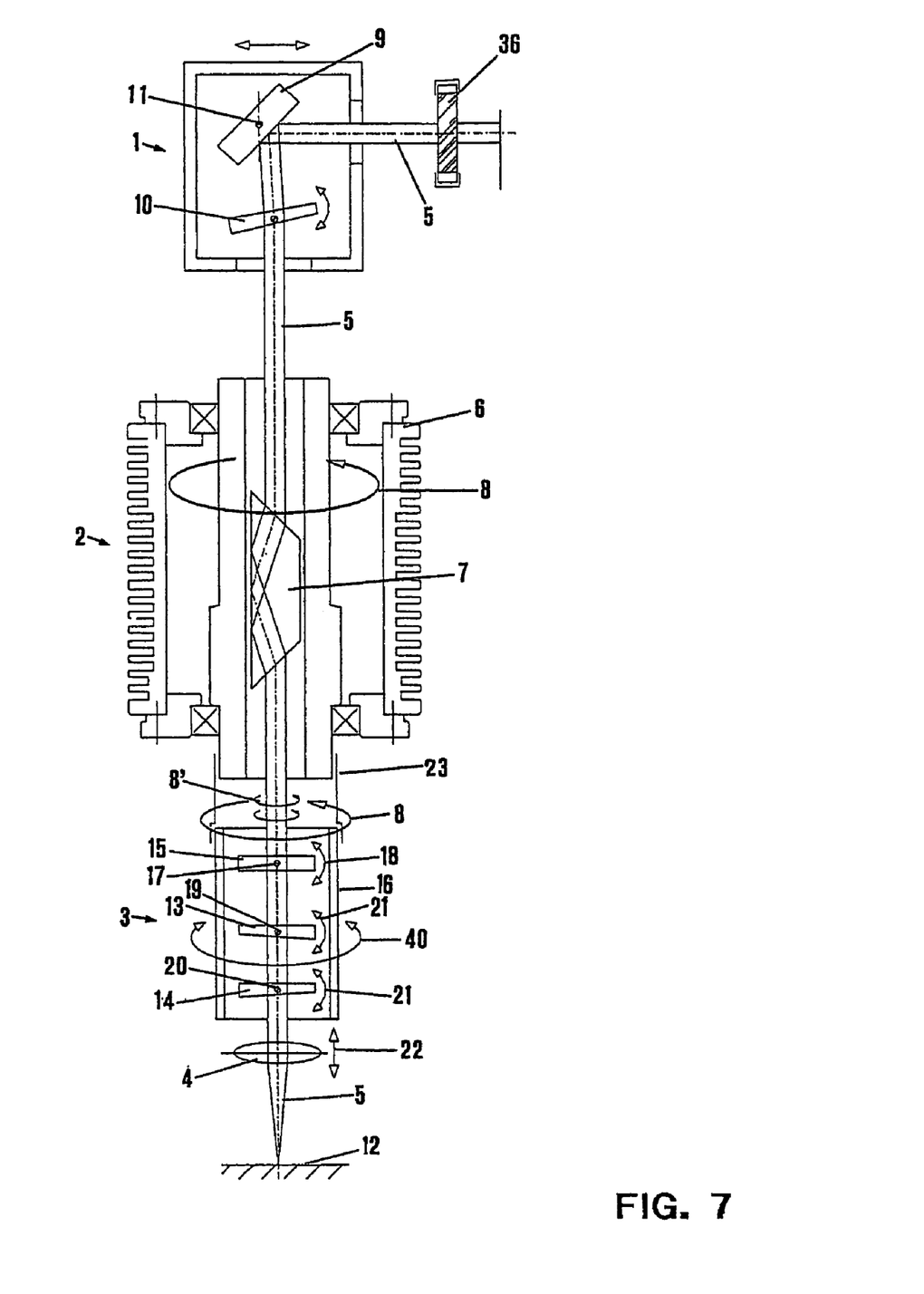
FIG. 7 is an illustration corresponding to FIG. 1, wherein, in comparison with the device of FIG. 1, a $\lambda/4$-plate is arranged on the input side of the beam manipulator.

FIG. 7 shows the arrangement of FIG. 1, but with an additional λ/4-plate 36 which is arranged on the input side of the beam manipulator 1 in the optical path of the laser beam. This λ/4-plate 36 serves to convert linearly polarized laser radiation into circularly polarized laser radiation. Otherwise, the construction of the device of FIG. 7 is identical with that shown in FIG. 1 and described with reference to FIG. 1.

Figure 8:
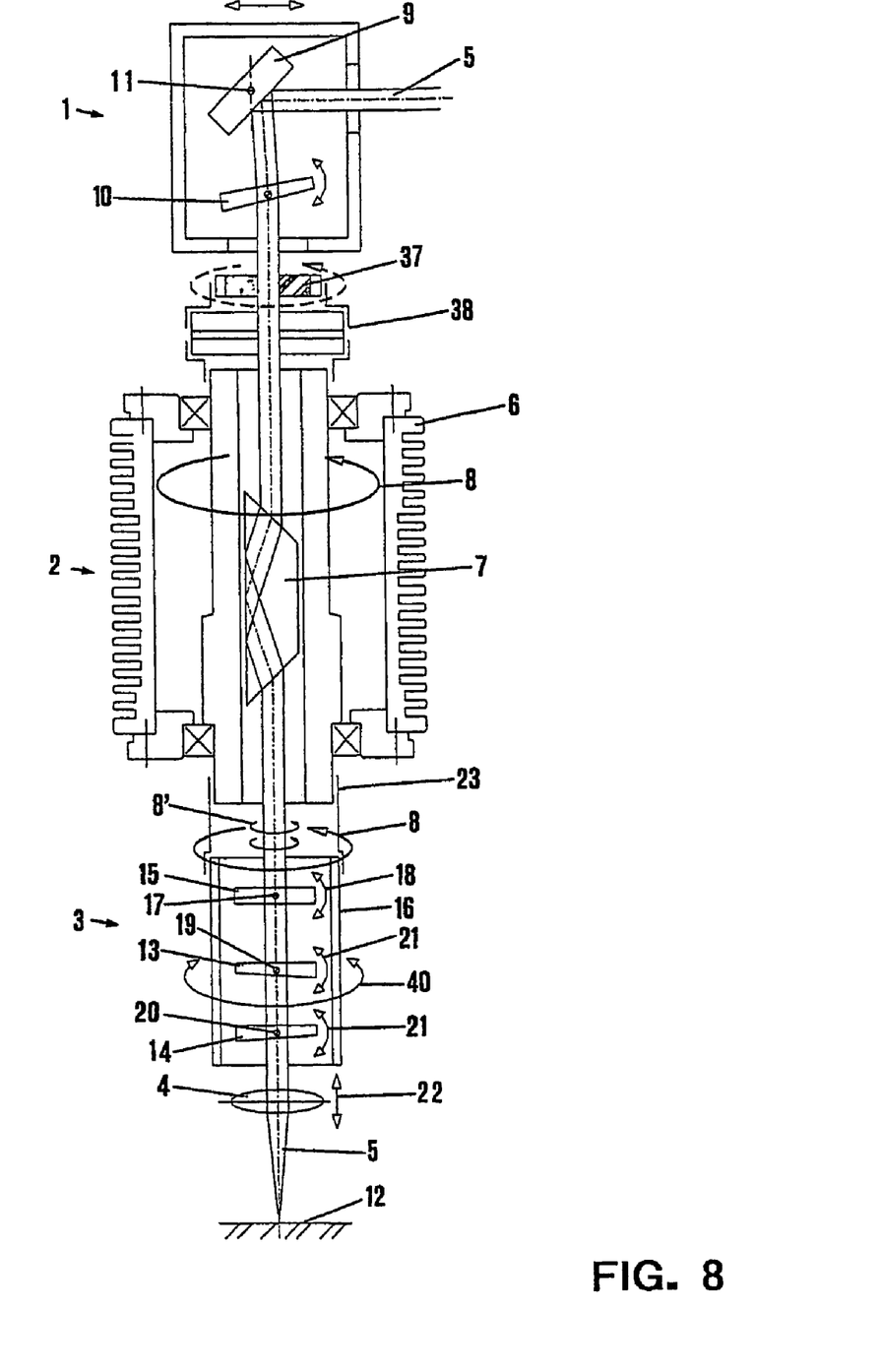
FIG. 8 is an illustration corresponding to FIG. 1, wherein, in comparison with the device of FIG. 1, a $\lambda/2$-plate is arranged on the output side of the beam manipulator.

Finally, FIG. 8 shows a device comparable with that of FIG. 1, but with an additional λ/2-plate 37 positioned on the output side of the beam manipulator 1 in the optical path of the laser beam 5. This λ/2-plate 37 is mounted on a rotation unit 38 which consists of a gearing and two coupling means, each between gearing and hollow shaft motor and between gearing and λ/2-plate 37, with which the λ/2 plate 37 is put into rotation in a direction coaxial to the hollow-shaft motor 6. Such a λ/2-plate 37 serves to co-rotate the polarization of the laser radiation, whereby polarization-induced removal variations are minimized in one revolution of the laser radiation.

The λ/4-plate 36 of FIG. 7 and the λ/2-plate 37 of FIG. 8 may be used in the other devices shown in FIGS. 2 to 6 at a corresponding place, as shown in FIG. 7 or 8.

There has thus been shown and described a novel device for drilling and for removing material using a laser beam which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A device for drilling and for removing material using a laser beam, said device comprising, in combination:
   a rotating image rotator;
   a beam manipulator which, when viewed in the beam direction, is arranged in front of the image rotator and serves to adjust the angle and position of the beam relative to the rotation axis of the image rotator;
   a focusing device located on the output side of the image rotator; and
   a compensating device, disposed between the image rotator and the focusing device, that rotates with the image rotator in the same direction of rotation and with the same rotational frequency, the compensating device comprising a parallel displacement unit and an angle changing unit;
   wherein the parallel displacement unit comprises a plane-parallel plate which is arranged directly after the image rotator and is rotatable in a direction perpendicular to the rotation axis;
   wherein the angle changing unit comprises two wedge plates, each being rotatable in a direction perpendicular to the rotation axis; and
   wherein the compensating device is adjustable in its rotating position relative to the image rotator in a basic setting.

2. The device according to claim 1, wherein the two wedge plates have opposite wedge angles.

3. The device according to and claim 1, wherein the two wedge plates and the plane-parallel plate are adjustably mounted relative to one another in their basic setting.

4. The device according to claim 1, wherein the image rotator comprises a prism.

5. The device according to claim 4, wherein the image rotator comprises a Dove prism.

6. The device according to claim 4, wherein the prism is arranged in the image rotator such that, when the image rotator is rotated once, a laser beam passed through the prism is rotated twice.

7. The device according to claim 4, wherein the image rotator comprises an Abbe-Koenig prism.

8. The device according to claim 4, wherein the prism has a trapezoid angle under which the polarization-induced intensity variation in one rotation of the prism is minimized.

9. The device according to claim 1, wherein the image rotator comprises a rigid K-mirror arrangement.

10. The device according to claim 1, wherein the two wedge plates are arranged adjacent to each other.

11. The device according to claim 1, wherein the image rotator is arranged in a hollow shaft motor.

12. The device according to claim 1, wherein the beam manipulator comprises a respective adjusting device for adjusting at least one of the incident beam position and the incident beam angle.

13. The device according to claim 12, wherein the respective adjusting device comprises highly dynamic actuators.

14. The device according to claim 12, wherein the incident beam position, and thus the entrance bore diameter, and the incident beam angle, and thus the exit bore diameter, are adjustable by a wedge plate, which is rotatable in a direction perpendicular to the optical path, and by a mirror which is displaceable together with the wedge plate in beam propagation direction.

15. The device according to claim 12, wherein the elements of the beam manipulator are movable in synchronism with the rotational movement of the image rotator so as to produce nonrotation-symmetrical bores.

16. The device according to claim 1, wherein the parts of the compensating device are arranged in a sleeve concentrically rotatable about the axis of the image rotator.

17. The device according to claim 1, wherein, when viewed in beam direction, a focusing device is provided after the compensating device, the focusing device being additionally arranged to be displaceable in beam direction.

18. The device according to claim 1, wherein a λ/2 plate, which is co-rotating in synchronism with the image rotator, is arranged between beam manipulator and image rotator to co-rotate the polarization.

19. The device according to claim 1, wherein the image rotator is formed by a K-mirror arrangement which is adjustable in its reflecting surfaces relative to each other.

20. The device according to claim 1, wherein a λ/4 plate, which is adjustable in a direction perpendicular to the beam propagation direction, is arranged in front of the beam manipulator.

* * * * *